US012612947B2

(12) United States Patent
Nicolai

(10) Patent No.: US 12,612,947 B2
(45) Date of Patent: Apr. 28, 2026

(54) CLUTCH DEVICE

(71) Applicant: Karlheinz Nicolai, Duingen
Lübbrechtsen (DE)

(72) Inventor: Karlheinz Nicolai, Duingen
Lübbrechtsen (DE)

( * ) Notice: Subject to any disclaimer, the term of this
patent is extended or adjusted under 35
U.S.C. 154(b) by 0 days.

(21) Appl. No.: 19/022,832

(22) Filed: Jan. 15, 2025

(65) Prior Publication Data

US 2025/0237272 A1     Jul. 24, 2025

(30) Foreign Application Priority Data

Jan. 18, 2024     (DE) ..................... 10 2024 101 411.3

(51) Int. Cl.
F16D 11/14          (2006.01)
B62M 25/00         (2006.01)
(52) U.S. Cl.
CPC ............. F16D 11/14 (2013.01); B62M 25/00
(2013.01)
(58) Field of Classification Search
CPC .... F16D 11/14; F16D 2023/123; B62M 25/00
See application file for complete search history.

(56) References Cited

U.S. PATENT DOCUMENTS 2,431,982 A  *  12/1947  Barnett .................. B62M 11/06
74/342
2023/0234535 A1*  7/2023  Yulish ..................... B62H 5/12
192/41 R

FOREIGN PATENT DOCUMENTS

DE          19903441 A1     8/2000
DE       102017129064 A1     6/2018
DE       102009060484 B4     4/2020
DE       102020208562 A1     1/2022
DE       102023211468 B3  *  10/2024   ............. F16H 3/663
EP          4 249 361       9/2023
GB          2592973 A    *  9/2021   ............. F16D 23/12
WO          9852817 A1     11/1998

OTHER PUBLICATIONS

Jun. 23, 2025 Search Report issued in European Patent Application
No. 25152158.9, pp. 1-8.
German Office Action for DE 10 2024 101 411.3 dated Sep. 10,
2024, 7 pages.

* cited by examiner

*Primary Examiner* — Stacey A Fluhart
(74) *Attorney, Agent, or Firm* — Nixon & Vanderhye PC

(57)          ABSTRACT

The invention relates to a clutch device for selective trans-
mission of a torque from a first shaft or hub to a second shaft
or hub, in particular for a gear-shifting system for a bicycle.
The clutch device has first and second clutch halves, an
opening device adapted to generate, from an operating
torque with which the first clutch half is supplied, in
particular by means of the operation of the bicycle with the
gear-shifting system, an opening force by means of which
the clutch device is opened, as well as an actuating device
for controlling the opening device.

According to the invention, the opening device is arranged
spatially separated from the torque transmission region of
the clutch device, i.e., from that spatial region at which,
when the clutch device is closed, a torque transmission from
the first to the second clutch half may take place.

Utilizing the operating torque to generate the opening force
for the clutch device facilitates opening the clutch device
and thus shifting under load.

20 Claims, 6 Drawing Sheets

*Fig.*5

CLUTCH DEVICE

CROSS-REFERENCE TO RELATED APPLICATION

This application claims priority to DE 10 2024 101 411.3 filed Jan. 18, 2024, the entire contents of which are hereby incorporated by reference.

TECHNICAL FIELD

The invention relates to a clutch device for a bicycle and to a gear-shifting system for a bicycle with such a clutch device. The bicycle may also be an electric bicycle.

BACKGROUND AND SUMMARY

Electric bicycles have an auxiliary drive which assists a cyclist's pedaling movement. In a bicycle, even an electric bicycle, a gear shift ensures that pedaling may occur over a wide speed range with an approximately steady cadence.

According to the prior art, the following gear shifts are used in bicycles and electric bicycles nowadays:

1) hub shifting systems
2) derailleur shifting systems
3) bottom-bracket shifting systems When handling different tasks within various environments where bicycles are employed, a shiftable gear set is indispensable in most cases. While in urban traffic without any hills, a single-speed bicycle, that is, a bicycle with a non-shiftable gear ratio, might suffice, its application soon reaches its limits when cycling prolonged distances, such as they prevail, e.g., in rural areas.

Steep climbs or descents in the mountain bike sector, heavy loads while transporting people or goods, ergonomic aspects during long-distance journeys or ever greater maximum speeds presuppose that a gear ratio of the torque and rotational speed applied may be altered by the cyclist during the journey. This allows the cyclist to adjust the cadence and pedal force to the respective situation.

In the case of a bicycle, the gear sets cited are mostly embodied in three different ways: as a shiftable traction gear set, a planetary gear set or a spur gear set.

Planetary gear sets are mostly used inside the hub housing on the rear wheel, whereas spur gear sets are often arranged in the vicinity of the bottom-bracket shaft. Traction gear sets predominantly establish the connection of the bottom-bracket shaft to the rear wheel hub, in particular in the form of a derailleur shifting system, as described below.

In the past sixty years, the chain drive with a shifting possibility on the rear wheel axle has become widespread in bicycles. For this, a rotatable bottom bracket with one or more chainrings is mounted on the frame which forms the load-bearing constituent part of the bicycle with all its receiving points for the front fork, the seat post as well as the rear wheel. On the hub of the rear wheel, there is a cassette consisting of up to thirteen pinions of various sizes. A rear derailleur is attached to a dropout end which establishes the connection from the frame to the rear axle, with the rear derailleur serving to guide the chain on the pinions of the cassette and to enable shifting processes. In addition, a front derailleur, which is mostly attached to the seat tube, may be used to change between various chainrings. Bicycles with a shift system such as that described above are generally referred to as bicycles with a derailleur shifting system.

Since the components of a bicycle with a derailleur shifting system are mounted on the outside of the frame due to their construction, they are particularly exposed to environmental influences, meaning increased wear, and wherein, as a consequence thereof, the efficiency decreases greatly after a short service life. The short maintenance intervals caused thereby, in particular in the case of bicycles with an auxiliary drive, become very cost-intensive due to the necessary replacement of the torque-transmitting structural parts of the traction gear set. Moreover, being in an exposed location on the rear wheel, the front derailleur is exposed to an increased risk of damage from falls or the like.

In so-called hub shifting systems as well as gear sets in the vicinity of the bottom bracket, hereinafter referred to as bottom-bracket gear sets, the structural parts are protected from external influences inside a housing. In this context, a hub shifting system mostly has a single one or more planetary gear sets connected in series which share the axis of rotation of the rear wheel as a coaxial axis of rotation of the individual gearing stages. Hub shifting systems are often also called gear hubs.

Hub shifting systems are thus shiftable planetary gear sets which are installed in the hub housing of the rear wheel. The hub shifting systems are arranged in a housing, which is encapsulated from the outside environment, and are therefore largely maintenance-free. However, a disadvantage of hub shifting systems is the high weight on the rear wheel, leading to an unfavorable weight distribution. Not only when carrying the bicycle, but also during cornering or during speedy off-road cycling, the high weight on the rear wheel hub is inconvenient.

A further disadvantage of the hub shifting systems available on the market nowadays is the lack of shiftability under load. For instance, with common hub shifting systems, a cyclist who is pedaling uphill under load in sixth gear with high torque and wishes to shift down a gear must first remove load from the pedals in order to enable the shifting process to fifth gear.

The torque of the cyclist is mostly directed via a traction gear set to the input shaft of the gear hub, converted by the planetary stages and transmitted to the hub housing, which consequently constitutes the output shaft of the gear set. The input shaft is often also called a driver. The spokes attached to the hub housing connect the gear set to the rim, which transmits the torque to the roadway by means of the outer tire. The embodiment in combination with a toothed belt as a traction gear set is significantly more low-maintenance than a chain and better protected against external influences.

Derailleur shifting systems possess improved shiftability under load as compared to hub shifting systems. As already mentioned, derailleur shifting systems possess many chain pinions on the rear wheel arranged next to one another in stages in the package, wherein the front derailleur guides the chain on a particular pinion depending on the gear engaged, and in this manner realizes a particular gear ratio. With a derailleur shifting system, this gear change is also possible under load.

In the past, derailleur shifting systems have been developed to transmit only the mechanical pedal power produced by a human to the rear wheel. If the bicycle additionally has an auxiliary drive, it is usually—in the case of the electric bicycles considered herein—seated on the bottom bracket. In these so-called mid-mounted motors, the power of the cyclist at the crank and the power of the electric motor are combined and relayed to the shifting system, whereby the power thus transmitted may become very large. In this configuration, derailleur shifting systems or hub shifting systems are usually employed nowadays because there is not enough space available at the bottom bracket for a shifting system.

However, as also already mentioned, derailleur shifting systems are disadvantageous in that their components, namely the pinions on the rear wheel hub, the at least one chainring as well as the chain along with the front derailleur, are unprotected and therefore soil easily. The wear is significantly increased due to the large power to be transmitted in the presence of an auxiliary drive. A derailleur shifting system is therefore comparatively high-maintenance. A maintenance interval for an electric bicycle with a derailleur shifting system may be between 600 and 1200 km. This must be deemed a disadvantage. Instead of or together with derailleur shifting systems, electric bicycles also use hub shifting systems on the rear wheel.

A more advantageous weight distribution results if the gear shift is positioned centrally in the bicycle, as is the case, for example, with bottom-bracket shifting systems. However, bottom-bracket shifting systems according to the prior art are quite large, so that no space remains around the bottom bracket for the electric motor. Also, the bottom-bracket shifting systems are already so heavy by themselves that the additional weight of an auxiliary drive would lead to an electric bicycle that would be too heavy for everyday use or for continuing to cycle with an empty battery. In addition, the shifting behavior under load in bottom-bracket shifting systems is similarly poor as it is in hub shifting system.

Bottom-bracket gear sets are mostly spur gear sets, such as, for instance, known from DE 10 2009 060 484 B4, the housings of which are fastened to the main frame of the bicycle. A protected and compact installation space around the bottom-bracket axis is thus utilized to achieve the function of the gear set. In this context, the input shaft of a bottom-bracket gear set is mostly directly connected to the cranks and pedals of the bicycle. At the output shaft, a traction gear set also transmits the torque to the rear wheel. This form of a bicycle gear set has the advantage that the weight of the gear set is situated at a central and low point, which has a positive effect on the center of gravity and thus on the ride characteristics. However, speedy utilization of a bicycle with a bottom-bracket shifting system or a hub shifting system is only possible with difficulty for the above-mentioned reasons.

In gearwheel sets, the various gear ratios, hereinafter referred to as gears or gear stages, are achieved by means of combinations of multiple gearwheel pairings or their individual gear ratios, respectively. Since in spur gear and planetary gear sets, all the gearwheels of each input or intermediate shaft are mostly in engagement with the respectively associated gearwheel of the following intermediate or output shaft at any time, it must be possible for each gearwheel of a pairing to be freely pivoted on its shaft, without transmitting any torque. By means of shiftable clutches, individual ones of these free gearwheels may be connected to the associated shaft or to a subsequent structural part in the direction of the torque flow in a torque-transmitting manner. Activation of individual clutches thus directs the torque through the gearwheel pairings, which in sum result in the desired overall gear ratio of a gear.

The clutches may be embodied as radial or axial clutches, mostly as positive clutches, which predominantly, according to the principle of a freewheel, transmit torques only in one direction of rotation. In FIGS. 9 and 10 of WO 98/52817 A1, the function of such a radial clutch is easy to identify as an example.

Switchable axial clutches are mostly embodied as dog clutches and each have one axially displaceable structural part and one axially fixed structural part, as also depicted in FIGS. 6 and 7 in WO 98/52817 A1.

The spur teeth of an axial clutch have the advantage over a radial clutch with pawls of having a substantially larger force-transmitting surface with the same installation space. Thus, the surface pressure is decreased in an advantageous manner.

Control of the axial clutches is assumed, as depicted, for example, in WO 98/52817 A1, by a so-called actuating member, also referred to below as a shifting drum. This is a cylindrical body with coiled grooves and/or protuberances and indentations impressed therein. In this respect, see also FIG. 15 of WO 98/52817 A1. Within hub shifting systems, the shifting drum is mostly arranged in a pivoted manner in a fixed hollow axle, hereinafter referred to as the main axle, wherein the angular position of the shifting drum in relation to the main axle defines the states of the individual clutches (active, inactive) for the gears. This angular position of the hollow axle may be controlled by the cyclist, either mechanically by Bowden cables or electrically via an actuator, from the handlebar of the bicycle.

If a single axial clutch according to WO 98/52817 A1 is considered, the two halves of the spur teeth are mostly held together in the engaged state with the aid of a spring. In order to disconnect the axial clutch, the spring-loaded clutch half is mostly moved axially with the aid of a sliding ring connected to the switching drum in such a way that the clutch is opened. Upon shifting under load, particular functional surfaces of the movable clutch half are in frictional connection with adjacent surfaces of the fixed clutch half. In order to shift from one gear to another gear under load, the static friction must first be overcome. Following this, the movable structural part of the clutch must be displaced further under the influence of the dynamic friction. Due to high frictional forces, shifting under load is only possible with difficulty or not at all.

Patent application 10 2023 211 468.2 by the same applicant (as yet unpublished) shows a clutch device in the form of a dog clutch, in which the side surfaces of the front-side teeth (of the dogs) of the two clutch halves do not lie in a radial plane which is disposed through the axis of rotation of the respective clutch half, but are inclined relative to that radial plane. This may have the effect that, when an operating torque is supplied to the driving clutch half, the front-side teeth may "slide off" against one another and the clutch device opens, unless it is held in the closed state, that is locked, by force. In other words, the dog clutch in this state may function as a slip clutch. In this way, opening the clutch device may be assisted by the operating torque which is applied, for example, by the cyclist of the bicycle whose gear-shifting system contains the clutch device. This also enables easier shifting under load since the operating torque itself may be employed to initiate the opening process of the clutch device and thus the shifting process.

Since in the reverse process, i.e., closing the clutch device, it is also necessary to counteract the assisted opening of the clutch device with the aid of the actuating device, greater forces and/or further machine elements such as, for instance, springs are necessary.

The object of the present invention is to provide a clutch device with an improved shifting capability under load.

This object is achieved by a clutch device or, respectively, by a gear-shifting system for a bicycle with such a clutch device. Advantageous developments of the invention are contained in the dependent claims.

The clutch device considered is provided for selective transmission of a torque from a first shaft or hub to a second shaft or hub, in particular for a gear-shifting system for a bicycle. It has a first clutch half connected to the first shaft or hub in a rotationally fixed manner, and a second clutch half connected to the second shaft or hub in a rotationally fixed manner. Furthermore, it has a first opening device adapted to generate, from an operating torque with which the first clutch half is supplied, in particular by means of an operation of a bicycle with a gear-shifting system containing the clutch device, a first opening force by means of which the clutch device is transitionable from a closed state, in which a torque is transmittable from the first clutch half to the second clutch half, to an opened state, in which no torque is transmittable from the first clutch half to the second clutch half. Further, it has an actuating device adapted for controlling the first opening device.

According to the invention, the first opening device is arranged spatially separated from the torque transmission region of the clutch device, i.e., that spatial region at which, in the closed state of the clutch device, a torque transmission from the first clutch half to the second clutch half may take place.

In this way, more degrees of freedom may be available when constructing the clutch device than is the case when the torque transmission region must additionally fulfil the function of opening assistance of the clutch device besides the actual function of torque transmission. In particular, it is made possible to design and optimize the two spatial regions—the torque transmission region and the first opening device—separately from one another without having to take into account interactions between the two functions cited. This may in particular also facilitate the construction of the actuating device, which no longer has to act directly upon the torque transmission region.

Simultaneously, this achieves the object of improving the shifting capability of the clutch device under load by assisting the opening of the clutch device by means of the operating torque. This improves the shifting capability under load since the operating torque itself may be employed to initiate the opening process of the clutch device and thus the shifting process.

In a preferred embodiment of the invention, the first opening device is arranged radially further outwards than the torque transmission region.

This spatial arrangement may result in a compact construction of the clutch device with a short axial overall length. Further, the first opening device, which is located radially further outwards, may be more easily accessible during construction for connection to the actuating device.

In a further preferred embodiment of the invention, a movable clutch half which is one of the first clutch half and the second clutch half is movable in an axial direction of the first shaft or hub or the second shaft or hub, respectively, and the first opening device has:

at least one first link surface arranged on the movable clutch half, extending in a first direction of extension substantially in a circumferential direction of the movable clutch half and having such a first curvature that a position changes in an axial direction of a point on the first link surface along the first direction of extension, and at least one first link follower adapted to contact the first link surface along the first direction of extension upon rotation of the movable clutch half, thereby to generate the first opening force and thereby to effect a movement of the movable clutch half in the axial direction, whereby the clutch device is transitioned from the closed state to the opened state.

In this context, the actuating device is adapted to engage the at least one first link follower with the first link surface and to disengage it from the first link surface.

Hereby, the first opening force may be generated in a simple manner from the operating torque, by having the at least one first link follower, upon its movement along the first direction of extension, effect a change in the position in the axial direction of its point of contact with the at least one first link surface and thus a movement of the entire at least one first link surface and, since the at least one first link surface is arranged on the movable clutch half, also of the entire movable clutch half. The at least one first link surface is preferably orientated such that the movement of the movable clutch half in this case takes place in a straight line in the opening direction of the clutch device, that is, in that axial direction in which the clutch device can be transitioned from the closed state to the opened state. Furthermore, the at least one first link follower is preferably arranged such that its position in the axial direction does not change upon its movement along the first direction of extension.

In a preferred variant of this embodiment of the invention, at least one first link surface and the at least one first link follower together form a wedge gear set. In this way, they together generate the first opening force and thus the movement of the movable clutch half in the axial direction.

The term "wedge gear set" is used presently in the usual mechanical sense of a gear set formed from a first body having a first surface and a second body having a second surface, wherein the first and second surfaces are in contact with one another and are movable relative to one another, wherein the first and/or the second surface is inclined or curved relative to a first direction, and wherein the first body is movable in the first direction and the second body is prevented from at least moving in the first direction, whereby a movement of the first body in the first direction results in a movement of the first and/or the second body with a component orthogonal to the first direction. The angle of inclination or the curvature of the first or second surface, respectively, relative to the first direction simultaneously results in a force ratio between the force introduced into the first body and the force component acting on the first or the second body, respectively, orthogonally to the first direction.

Presently, at least the first link surface is curved relative to the first direction of extension due to the first curvature. If the link follower is immovable in the position in which it contacts the first link surface, a rotation of the movable clutch half thus generates a force acting upon the movable clutch half with a component orthogonal to the first direction of extension and thus in the axial direction, i.e., the first opening force, and the movable clutch half moves in the axial direction.

In a preferred variant of this embodiment of the invention, the first opening device furthermore has a first hold-open surface arranged on the movable clutch half such that the clutch device is in the opened state upon contacting the first hold-open surface by the at least one first link follower, wherein the first hold-open surface is arranged adjacent to a region of the at least one first link surface upon contacting of which by the at least one first link follower the clutch device is in the opened state.

In this way, following the movement of the movable clutch half in the opening direction of the clutch device and the opening of the clutch device effected thereby, it can be achieved that the clutch device remains in the opened state. The first hold-open surface preferably has the shape of an annular, planar surface which is arranged orthogonally to the axis of rotation of the movable clutch half and concentrically thereto. Thus, the at least one first link follower may contact the first hold-open surface for any period of time, in particular throughout several revolutions of the movable clutch half, without the axial position of the movable clutch half changing. The clutch device may thus persistently be held open as soon as the at least one first link follower contacts the first hold-open surface. Also in this case, the at least one first link follower is preferably arranged such that its position in the axial direction does not change upon contacting the first hold-open surface.

In a preferred variant of the embodiment of the invention with at least one first link surface and at least one first link follower, the at least one first link follower, by means of a movement of the at least one first link follower in the radial direction of the movable clutch half, in particular by a lever or slider mechanism, is engageable with the at least one first link surface and/or disengageable from the at least one first link surface.

Hereby, the function of the actuating device of engaging the at least one first link follower with the at least one first link surface and disengaging it from the at least one first link surface is realized in a simple manner. A movement of the at least one first link follower in the radial direction of the movable clutch half is particularly suitable for this if the first opening device is arranged radially further outwards than the torque transmission region since in this case, the at least one first link surface is also particularly easy to access from radially outside. A lever or slider mechanism, by means of which the at least one first link follower is swiveled or slid in, respectively, from radially outside into the at least one first link surface, is a structural element which is easy to construct and which may also be controlled in a simple manner by a mechanical actuating device.

In a preferred variant of this embodiment of the invention, the movement of the at least one first link follower in the radial direction of the movable clutch half upon engaging the at least one first link surface is at least partially effected by a spring, in particular by releasing the spring.

The spring thus leads to an opening of the clutch device, even when the actuating device is not actuated. This variant thus constitutes a simple possibility of realizing a clutch device which is opened while in the idle state. This is particularly advantageous when the actuating device fails, for example due to an interruption of an electrical connection or any other defect of an electrical actuating device since the clutch device—and optionally all the clutch devices in the gear set—then opens and thus jamming of the gear set is avoided.

In a further preferred variant of the embodiment of the invention with at least one first link surface and at least one first link follower, the first opening device has a plurality of first link surfaces arranged along the circumferential direction of the movable clutch half.

In this way, the individual first link surfaces arranged distributed across the circumference of the movable clutch half may each be formed to be shorter than would be the case if only a single first link surface were present. Thereby, generating the first opening force and thus opening the clutch device may also take place more rapidly as soon as the at least one first link is engaged with one of the first link surfaces by the actuating device.

In a further preferred variant of the embodiment of the invention with at least one first link surface and at least one first link follower, the first opening device has a plurality of first link followers arranged along the circumferential direction of the movable clutch half.

In this way, a more uniform generation of the first opening force, distributed over several locations distributed across the circumference of the movable clutch half, can be achieved. Further, by distributing the first opening force over the several first link followers, each individual first link follower is correspondingly loaded less. In particular, the frictional force acting in each case between a first link follower and the first link surface contacted by it is correspondingly attenuated. Preferably, the several first link followers are arranged at substantially equal distances along the circumferential direction of the movable clutch half.

In a further preferred embodiment of the invention, the clutch device has a second opening device adapted to generate, without use of the operating torque, a second opening force by means of which the clutch device is transitionable from the closed state to the opened state, wherein the actuating device is adapted for controlling the second opening device.

The second opening device thus provides an additional possibility to transition the clutch device from the closed state to the opened state by means of the second opening force. Preferably, the first and second opening devices become effective under distinct operating conditions of the clutch device, in particular under distinct operating torques. In this context, an operating torque at which the second opening device is effective is preferably less than an operating torque at which the first opening device is effective.

Where a second opening force is mentioned in this document, this force is preferably independent of the first opening force. That is, it does not necessarily arise in addition to the first opening force.

In this embodiment of the invention, the clutch device is capable, with the aid of the second opening device, of generating, even when stationary or at a low rotational speed, the second opening force by means of which the clutch device may be transitioned from the closed state to the opened state.

When the clutch device according to the invention is used in a gear-shifting system for a bicycle, the first opening device preferably becomes effective when the cyclist is pedaling during the journey, whereby an operating torque—which may be quite large—is applied to the clutch device, and simultaneously wishes to engage a different gear, i.e., they wish to shift gears under load. In this case, the operating torque is utilized to generate a first opening force for the clutch device.

In contrast, the second opening device preferably becomes effective in a gear-shifting system for a bicycle when the cyclist is not pedaling or is pedaling only slightly or slowly during the journey and wishes to engage a different gear or when they wish to shift gears while standing still, i.e., when gears are to be shifted with little or no load. In this case, no or only a low operating torque is available at the clutch device. Conversely, however, there is also no high frictional force which has to be overcome when opening the clutch, i.e., only a small opening force has to be applied for the clutch. Thus, a second opening force may be generated by the second opening device and thus without use of the operating torque in order to open the clutch device.

In this embodiment of the invention, the actuating device is adapted both for controlling the first opening device and for controlling the second opening device.

In a preferred variant of this embodiment of the invention, the second opening device is arranged radially further outwards than the torque transmission region.

This may result in the same advantages as the corresponding arrangement of the first opening device.

In a further preferred variant of this embodiment of the invention, the second opening device has:

at least one second link surface arranged on the movable clutch half, extending in a second direction of extension substantially in a radial direction of the movable clutch half and having such a second curvature that a position changes in an axial direction of a point on the at least one second link surface along the second direction of extension, and at least one second link follower adapted to contact the at least one second link surface along the second direction of extension, thereby to generate the second opening force and thereby to effect a movement of the movable clutch half in the axial direction, whereby the clutch device is transitioned from the closed state to the opened state, wherein the actuating device is adapted to engage the at least one second link follower with the at least one second link surface, to move it along the second direction of extension and to disengage it from the second link surface.

Hereby, the second opening force may be generated without use of the operating torque, by having the at least one second link follower, upon its movement along the second direction of extension, effect a change in the position in the axial direction of its point of contact with the at least one second link surface and thus a movement of the entire second link surface and, since the second link surface is arranged on the movable clutch half, also of the entire movable clutch half. The at least one second link surface is preferably orientated such that the movement of the movable clutch half in this case takes place in a straight line in the opening direction of the clutch device, that is, in that axial direction in which the clutch device can be transitioned from the closed state to the opened state. Furthermore, the at least one second link follower is preferably arranged such that its position in the axial direction does not change upon its movement along the second direction of extension.

In a preferred variant of this embodiment of the invention, at least one second link surface and the at least one second link follower together form a wedge gear set. In this way, they together generate the second opening force and thus the movement of the movable clutch half in the axial direction.

In this case, at least the second link surface is curved relative to the second direction of extension due to the second curvature. The link follower moving in the second direction of extension upon contacting the second link surface thus generates a force acting upon the movable clutch half with a component orthogonal to the second direction of extension and thus in the axial direction, i.e., the second opening force, and the movable clutch half moves in the axial direction.

Contrary to the first direction of extension of the at least one first link surface, the second direction of extension of the at least one second link surface is not disposed in the circumferential direction, but in the radial direction of the movable clutch half. A movement of the at least one second link follower along the second direction of extension upon its contacting the at least one second link surface is thus independent of a rotation of the movable clutch half. In particular, such a movement of the at least one second link follower may also take place when the movable clutch half is stationary, that is, for example, when the bicycle whose gear shifting system contains the clutch device is standing still. Since the relative movement between the at least one second link surface and the at least one second link follower—unlike the first opening device—cannot be generated from the rotation of the movable clutch half, the actuating device is additionally adapted to move the at least one second link follower along the second direction of extension.

The two different directions of extension also allow arranging the at least one first and the at least one second link surface spatially close to one another and even overlapping one another and thus to utilize the available installation space well.

In a further preferred variant of the embodiment of the invention with a second opening device, the at least one second link surface has a second hold-open surface, wherein the clutch device is in the opened state upon contacting the second hold-open surface by the at least one second link follower.

This may result in the same advantages as the first hold-open surface.

In a further preferred variant of the embodiment of the invention with at least one second link surface and at least one second link follower, the at least one second link follower, by means of a movement of the at least one second link follower in the radial direction of the movable clutch half, in particular by a lever or slider mechanism, is engageable with the second link surface and/or disengageable from the second link surface.

This may result in the same advantages as the corresponding functionality of the at least one first link follower.

In a preferred variant of this embodiment of the invention, the movement of the at least one second link follower in the radial direction of the movable clutch half upon engaging the at least one second link surface and/or the movement of the at least one second link follower along the second direction of extension is at least partially effected by a spring, in particular by releasing the spring.

This may result in the same advantages as the corresponding functionality of the at least one first link follower.

In a further preferred variant of the embodiment of the invention with at least one second link surface and at least one second link follower, the second opening device has a plurality of second link surfaces arranged along the circumferential direction of the movable clutch half.

This may result in the same advantages as the corresponding plurality of first link surfaces.

In a further preferred variant of the embodiment of the invention with at least one second link surface and at least one second link follower, the second opening device has a plurality of second link followers arranged along the circumferential direction of the movable clutch half.

This may result in the same advantages as the corresponding plurality of first link followers.

In a preferred variant of the embodiment of the invention with at least one first and at least one second link surface as well as with at least one first and at least one second link follower, the at least one first link surface is at least partially identical to the at least one second link surface, and/or the at least one first link follower is substantially identical to the at least one second link follower.

If the at least one first link follower is substantially identical to the at least one second link follower, it is preferred that this link follower has first and second surfaces, wherein the first surface forms a wedge gear set with a first link surface and the second surface forms a wedge gear set with a second link surface. In this context, preferably, the first surface faces in the first direction of extension and/or the second surface faces in the second direction of extension. As an alternative to first and second surfaces, they may also be first and second surface sections of a common, continuous surface of the link follower.

As already mentioned above, the two different directions of extension of the at least one first and the at least one second link surface allow arranging the two link surfaces spatially close to one another and even overlapping one another. According to the present variant, the two link surfaces may even be at least partially identical, i.e., at least one partial surface of the at least one first link surface is also a partial surface of the at least one second link surface. Preferably starting from this common partial surface, the at least one first link surface then extends substantially in the circumferential direction and the at least one second link surface extends substantially in the radial direction of the movable clutch half.

In this way, it is possible for the first or the second opening device to become effective automatically, depending on the operating torque applied to the clutch device: With low or no operating torque present at all, the at least one second link follower is moved along the second direction of extension by the actuating device, thereby generating the second opening force. With a higher operating torque, a correspondingly greater second opening force would be required, wherein the actuating force of the actuating device may not be sufficient to generate it. Instead, the at least one first link follower (which according to this variant may be identical to the at least one second link follower) moves along the first direction of extension due to a rotation of the movable clutch half and thereby generates the correspondingly greater first opening force from the operating torque.

The partially identical formation of the at least one first and the at least one second link surface or the identity of the at least one first and the at least one second link follower, respectively, may furthermore result in better utilization of the installation space, a more compact construction and/or a reduction in the number of parts of the clutch device.

In a further preferred variant of the most recently described embodiment of the invention, which further comprises a first hold-open surface and a second hold-open surface, the first hold-open surface is substantially identical to the second hold-open surface.

The identity of the first and the second hold-open surfaces may again result in particular in better utilization of the installation space and a more compact construction of the clutch device. This is the case, in particular, when the first and the second hold-open surface have the shape of an annular surface extending over the entire circumference of the movable clutch half since the hold-open surface then takes up a relatively large installation space which, however, has to be provided only once. The invention further relates to a gear-shifting system for a bicycle with at least one clutch device according to the invention.

Employing the clutch device according to the invention in a gear-shifting system for a bicycle makes it possible, as explained initially, to shift the gear-shifting system even under load. This increases the ride comfort for the cyclist since they no longer have to interrupt the pedaling process for a short time when shifting, or at the least relieve the pedals when pedaling, in order to perform the shifting process. Particularly in the case of uphill cycling, in particular during out-of-saddle riding, such an interruption or relief of the pedals is only possible with difficulty or at the least disrupts the pedaling rhythm, that is, makes the cyclist "lose their cadence" and may cost valuable time, in particular in bicycle racing during competitions. In addition, an automatic shifting system may also be realized.

BRIEF DESCRIPTION OF THE DRAWINGS

Exemplary embodiments of the invention will be explained in greater detail below with reference to the drawings. In the drawings.

DETAILED DESCRIPTION

FIGS. 1 to 4 show the same exemplary embodiment of a clutch device 1 according to the invention in the form of an axial dog clutch.

Figures 1A, 1B:
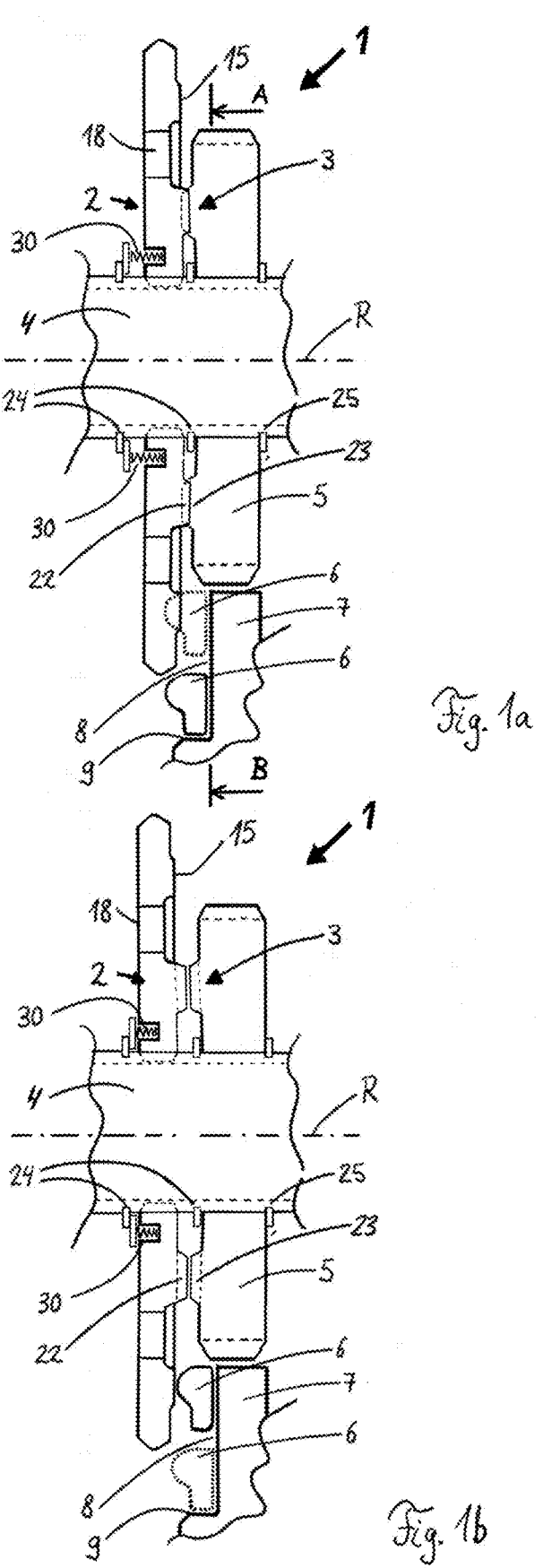
FIG. 1*a* shows a cross-section of a clutch device according to the invention along the axis of rotation of the clutch device in the closed state.
FIG. 1*b* shows a cross-section of a clutch device according to the invention along the axis of rotation of the clutch device in the opened state.
Figure 2:
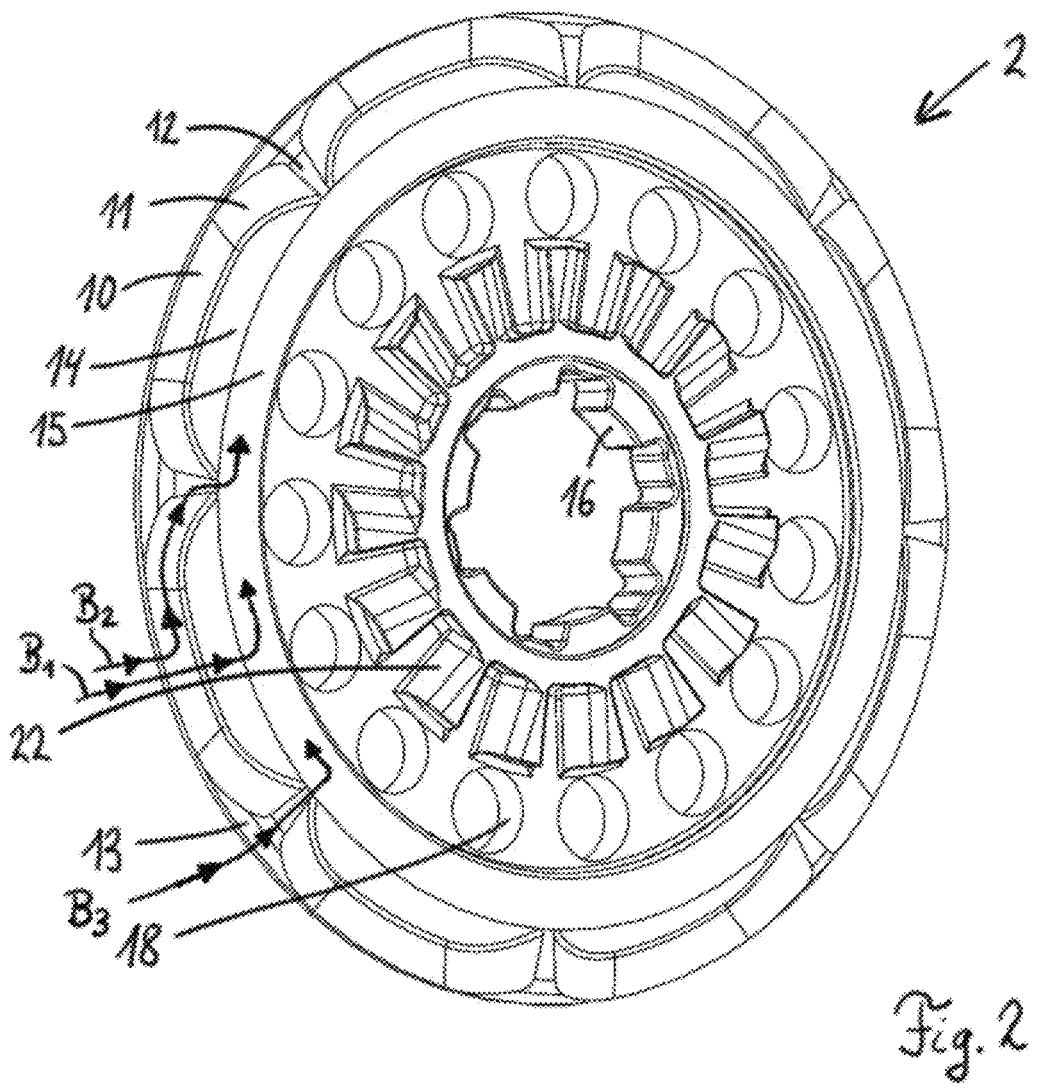
FIG. 2 shows a perspective view of the movable clutch half of the clutch device according to FIG. 1.

FIG. 1 shows a cross section through a clutch device 1 according to the invention along the axis of rotation R of the clutch device. It has a movable clutch half 2 which is mounted on a shaft 4 by means of internal splines 16 (see FIG. 2) in the movable clutch half 2 and corresponding external splines 17 on the shaft 4 (see FIG. 4) so as to be axially displaceable but rotationally fixed. The axial region in which the movable clutch half 2 is displaceable on the shaft 4 is delimited by two retaining rings 24.

Furthermore, the clutch device 1 has a fixed clutch half 3 which is connected in a rotationally fixed manner, in the exemplary embodiment integrally, to a gearwheel 5. The gearwheel 5 in turn is in meshing engagement with a further gearwheel 30 (see FIG. 3) and forms part of a gear-shifting system for a bicycle. The fixed clutch half 3 is freely pivoted on the shaft 4 by means of a bearing, in particular a journal bearing (not depicted). An axial movement of the fixed clutch half 3 on the shaft 4 is prevented by two retaining rings 24, 25, wherein the retaining ring 24 simultaneously limits the displaceability of the movable clutch half 2 towards the fixed clutch half 3.

The movable clutch half 2 is pressed against the fixed clutch half 3 by a spring 30, so that the clutch device 1 is closed while in the idle state.

The clutch device 1 is provided for selectively transmitting a torque from the shaft 4 via the movable clutch half 2 to the fixed clutch half 3 and thus to the gearwheel 5.

Figure 4:
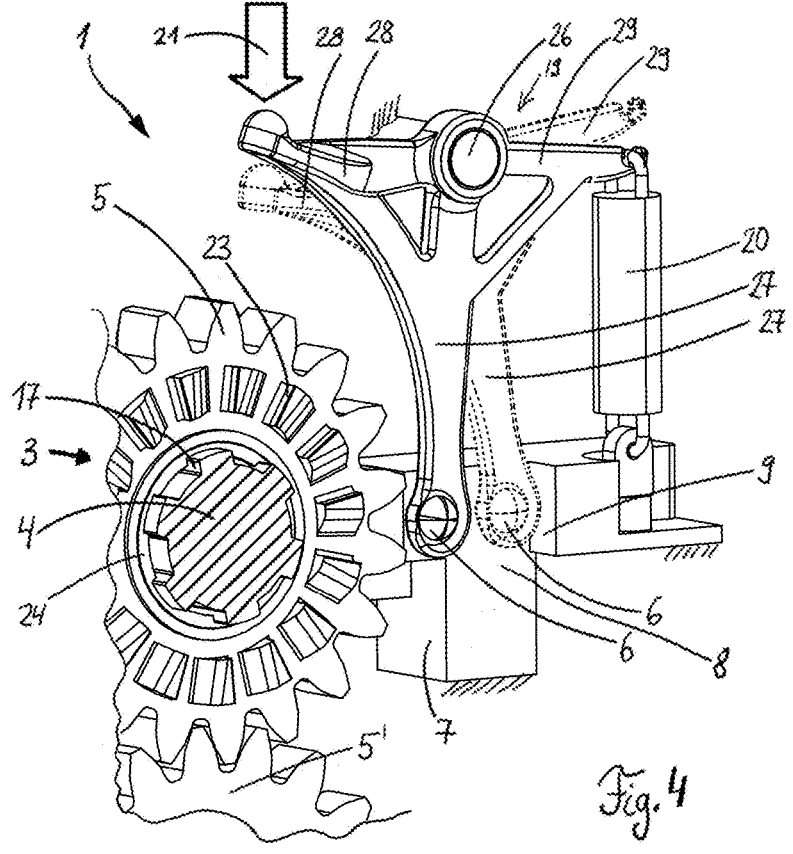
FIG. 4 shows a perspective view of the clutch device according to FIG. 1 without the movable clutch half.

The torque transmission takes place by means of spur teeth 22 on the movable clutch half 2 (see FIG. 2) as well as corresponding spur teeth 23 on the fixed clutch half 3 (see FIG. 4). The teeth of the spur teeth 22, 23 act as dogs which may engage one another axially by an axial displacement of the movable clutch half 2 towards the fixed clutch half 3.

Those side surfaces of the teeth of the spur teeth 22, 23 which come into abutment with one another in a direction of rotation corresponding to the drive direction in the gear set are arranged straight or almost straight, i.e., they lie in a radial plane through the axis of rotation of the movable clutch half 2 or of the fixed clutch half 3, respectively, so that the torque transmission takes place orthogonally to those side surfaces.

In contrast, the side surfaces of the teeth of the spur teeth 22, 23 which come into abutment with one another in the other direction of rotation, the non-drive direction, are strongly inclined with respect to the radial plane cited, so that they may slip against one another when a torque is supplied to the movable clutch half 2 in the non-drive direction. By means of the action of the wedge gear set formed by these side surfaces of the spur teeth 22, 23 in this context, the movable clutch half 2 is displaced away from the fixed clutch half 3 counter to the action of the spring, which presses it against the fixed clutch half 3, so that no torque may be transmitted in the non-drive direction.

In this way, a freewheel function is realized in the non-drive direction. This may be required so that the gear set does not jam upon a gear change in which several clutches are closed simultaneously for a short time. The freewheel function may also be required in order to decouple the gear set or parts thereof in the non-drive direction from drive components such as, for example, an electric auxiliary motor. Such a freewheel function may also ensure that the cyclist may stop the pedaling movement in any riding situation. This is important as a safety function even in the event of faults in the gear set or in the electric auxiliary drive.

Through-holes 18 are arranged radially directly outwards of the spur teeth 22, distributed across the circumference of the movable clutch half 2, which allow the flow of oil and thus guarantee lubrication and cooling of the clutch device 1 at all locations between the movable clutch half 2 and the fixed clutch half 3.

As may be seen in FIG. 1, the movable clutch half 2 has a greater radius than the fixed clutch half 3 or than the gearwheel 5, respectively, so that the radially outer region of the movable clutch half 2 is freely accessible on that axial side which faces the fixed clutch half 3. In this radially outer region of the movable clutch half 2, several link surfaces with respective portions 10 to 14 are arranged, by means of which the clutch device 1 may be opened in connection with associated link followers 6.

Each link follower 6 is realized in this exemplary embodiment as a hemispherical pressure piece which is arranged at the outer end of a lever arm 27 of a lever 19 such that the apex of the hemisphere, which serves as a pressure point on the link surface, is arranged on one side of the plane in which the lever 19 is swiveled and directed away from it. The lever 19 is swivelable about a lever bearing 26 such that the link follower 6 may be swiveled in from radially outside into the link surfaces (see FIGS. 3 and 4).

On the side of the lever arm 27 opposite the link follower 6 with respect to the plane in which the lever 19 is swiveled, it rests against a support 7 which prevents any axial deflection of the lever arm 27 and the link follower 6 towards the fixed clutch half 3. In this respect, the support 7 has an abutment surface 8 for the link follower 6 along which the side of the lever arm 27 opposite the link follower 6 slides in the radial direction upon swiveling the lever 19. The radially outermost position of the link follower 6, in which the link follower 6 is swiveled completely out of the region of the link surface of the movable clutch half 2, is specified by a stop surface 9 in the support 7.

Figure 5:
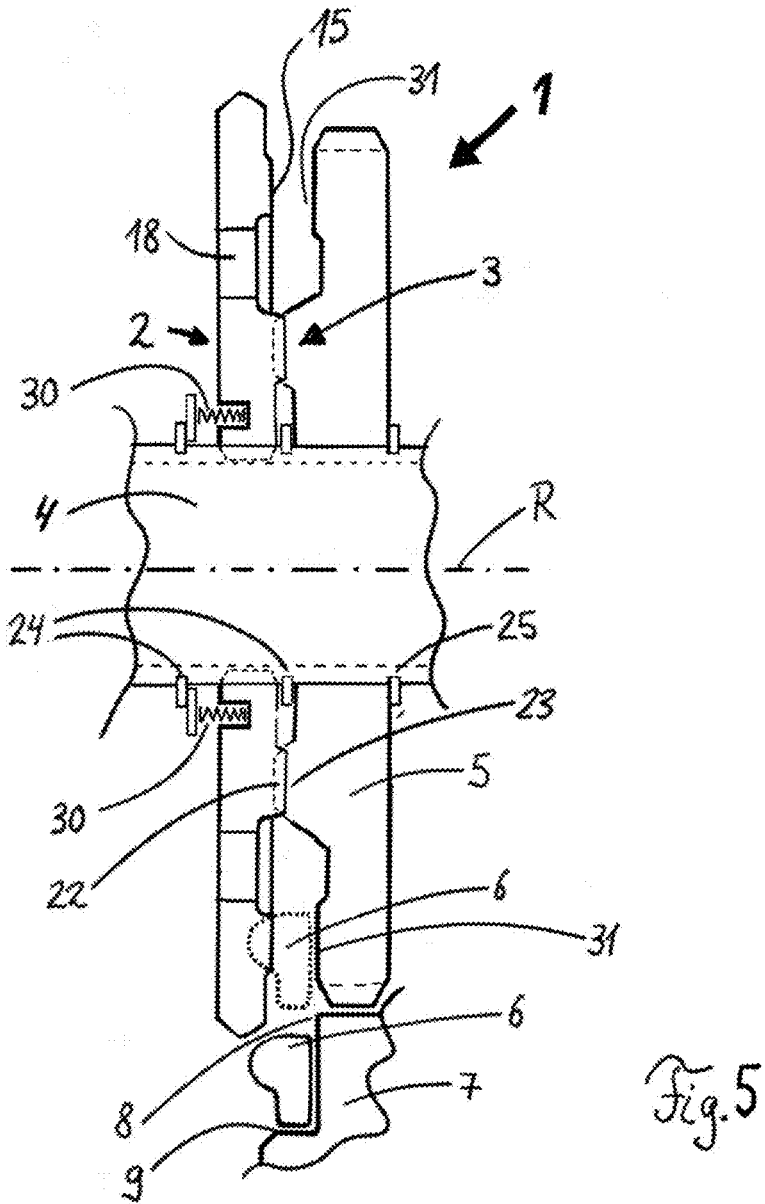
FIG. 5 shows a cross-section of a clutch device according to the invention in a further exemplary embodiment along the axis of rotation of the clutch device in the closed state.

In a further exemplary embodiment of the clutch device according to the invention, depicted herein in FIG. 5, the abutment surface for the link follower 6 may also be arranged on a rotating structural part, such as, for example, on the gearwheel 5. The clutch device in FIG. 5 corresponds to that in FIG. 1, with the gearwheel 5 having a larger diameter. In this context, the rotating abutment surface 31 for the link follower 6 is formed by a side surface of the gearwheel 5.

Distributed across the radially outer circumference of the movable clutch half 2, a total of eight identically designed link surfaces are arranged which adjoin one another in the circumferential direction without any gaps. Each link surface has several portions, namely a base region 10 disposed at the outer radial edge of the movable clutch half 2 in the form of a narrow path and having a constant axial level in the circumferential direction, a first circumferential portion 11 also disposed at the outer radial edge of the movable clutch half 2 in the form of a narrow path and adjoining the base region 10 in the circumferential direction, with a curvature in the axial direction towards the fixed clutch half 3 and simultaneously slight swiveling radially inwards, a second circumferential portion 12 adjoining the first circumferential portion 11 in the form of a short section in the circumferential direction and having a constant level in the axial direction, a third circumferential portion 13 forming the radially outer end face of the movable clutch half 2 in the region of the first circumferential portion 11 and the second circumferential portion 12 and having a slight inclination radially inwards towards the second circumferential portion 12, a radial portion 14 extending radially inwardly and laterally adjacent to the base region 10 and to the first circumferential portion 11 and adjoining it and thereby being curved or arched, respectively, radially inwards axially towards the fixed clutch half 3, so that the radial portion 14 reaches the same axial level as the second circumferential portion 12 at its radially inner edge.

Radially within the second circumferential portion 12 and the radial portion 14 of the link surface, an annular hold-open surface 15 adjoins, continuous and closed across the circumference of the movable clutch half 2 and having the same axial level as the second circumferential portion 12 as well as the radially inner edge of the radial portion 14 throughout.

Due to the above-described geometry of the link surface and the hold-open surface 15, the following possible motion paths B1 to B3 result for the link follower 6 as soon as it is swiveled in from radially outside into the region of the link surface (see FIG. 2):

Motion path B1: If no or only a low operating torque is applied to the movable clutch half 2 and correspondingly only low frictional forces act between the spur teeth 22, 23, the link follower 6 is pressed further radially inwards onto the radial portion 14 by the lever arm 27 when swiveled in from radially outside into the base region 10 of the link surface. The hemispherically formed link follower 6 and the radial portion 14 cooperate in this context in the form of a wedge gear set. Since the link follower 6 cannot deflect axially due to the support of the lever arm 27 on the abutment surface 8 of the support 7, the entire movable clutch half 2 is displaced away from the fixed clutch half 3 in the axial direction due to the axial curvature or arch, respectively, of the radial portion 14. Hereby, the spur teeth 22, 23 are disengaged and the clutch device 1 opens. The link follower 6 is pressed further radially inwards by the lever arm 27, finally arrives at the hold-open surface 15 and circles it. Since the hold-open surface 15 is continuous in the circumferential direction and has a constant axial level, the clutch device 1 may in principle be held open for any period of time in this manner.

Motion path B2: If more than only a low operating torque is applied to the movable clutch half 2 and correspondingly greater frictional forces act between the spur teeth 22, 23, the link follower 6 cannot be pressed further radially inwards onto the radial portion 14 by the lever 19 when swiveled in from radially outside into the base region 10 of the link surface since the actuating force of the lever 19 is insufficient to do so. The link follower 6 thus remains in the base region 10 and is guided onto the first circumferential portion 11 by the rotation of the movable clutch half 2. In this case, the hemispherically formed link follower 6 and the first circumferential part 11 cooperate in the form of a wedge gear set. Due to the axial curvature of the first circumferential portion 11, the entire movable clutch half 2 is displaced away from the fixed clutch half 3 in the axial direction, and the clutch device 1 opens. The opening force generated in this context is generated by the operating torque and is thus correspondingly greater than the opening force in the case of the above-described motion path B1. The opening force is therefore also sufficient to overcome the greater frictional forces between the spur teeth 22, 23. Following the direction of the first circumferential portion 11, the link follower 6 is simultaneously swiveled slightly radially inwards under the action of the lever 19. Thereafter, the link follower 6 reaches the second circumferential portion 12, is pressed further radially inwards by the lever 19 and finally arrives at the hold-open surface 15 with the effect described above for the motion path B1.

Motion path B3: Depending on the rotational position of the movable clutch half 2, the link follower 6, upon being swiveled in from radially outside, may also strike the third circumferential portion 13 rather than the base region 10 of the link surface. In this case, the link follower 6 and the third circumferential part 13 cooperate in the form of a wedge gear set. If no or only a low operating torque is applied to the movable clutch half 2, the link follower 6 is instantly swiveled radially inwards by the lever 19 onto the second circumferential portion 12, and the movable clutch half 2 moves axially away from the fixed clutch half 3. With greater operating torque applied and correspondingly greater frictional forces between the spur teeth 22, 23, the link follower 6 cannot move radially inwards solely by the actuating force of the lever 19 on the third circumferential portion 13, but must first "wait" until it arrives at the base region 10 of the link surface by means of the rotation of the movable clutch half 2. Thereafter, it will continue to move in the form of the motion path B2, as described above.

Thus, each of the motion paths B1, B2 and B3—depending on the magnitude of the applied operating torque—effects an opening of the clutch device 1.

From the respective portions 10 to 14 of the link surfaces, on which the link follower 6 moves according to the motion paths B1 to B3, it furthermore becomes evident that the clutch device 1 has two link surfaces in the exemplary embodiment: The first link surface comprises the base region 10, the first circumferential portion 11 and the second circumferential portion 12 and extends substantially in the circumferential direction of the movable clutch half 2. The second link surface comprises the base region 10 and the radial portion 14 and extends substantially in the radial direction of the movable clutch half 2. The first and second link surfaces are thus partially identical by both comprising the base region 10.

Figure 3:
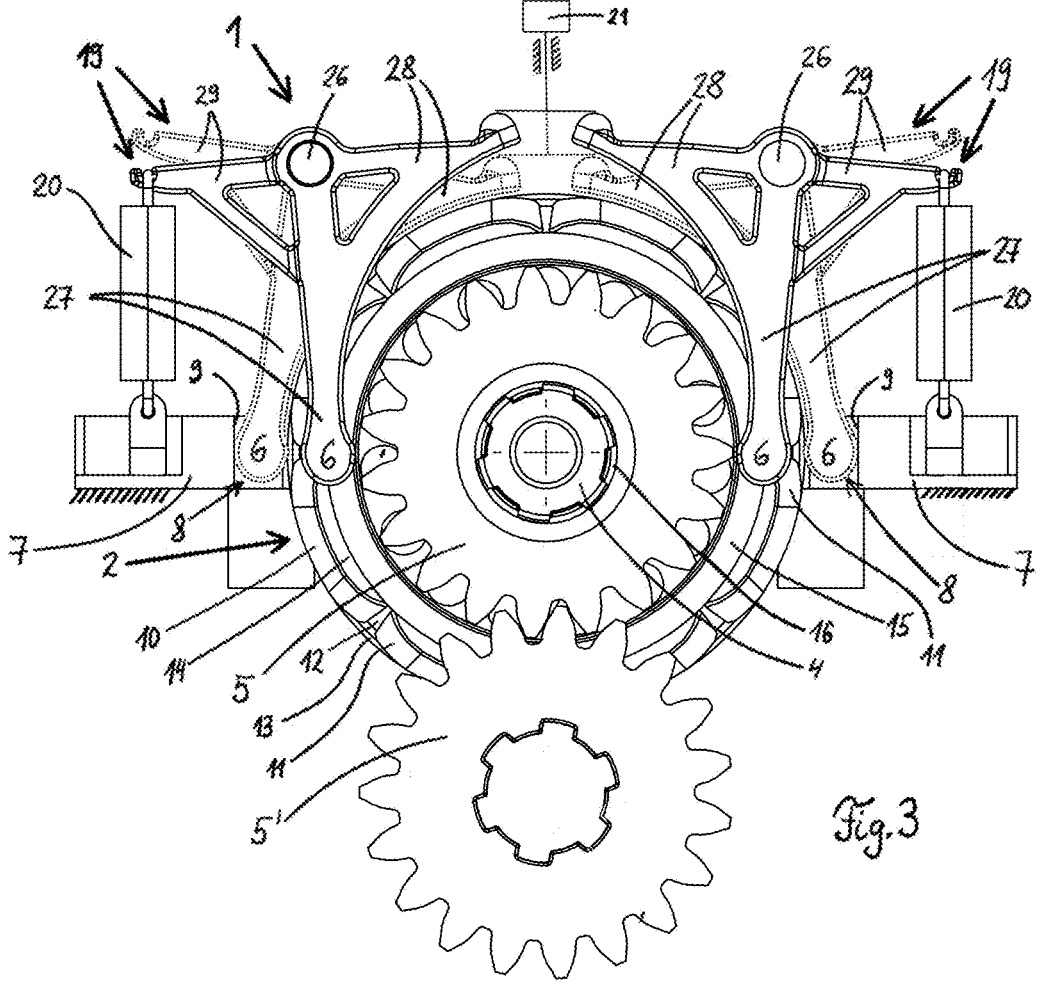
FIG. 3 shows a top view of the clutch device according to FIG. 1 in an axial direction.

FIGS. 3 and 4 show the mode of operation of the lever 19 in various depictions. As already mentioned, the lever 19 may be swiveled about a lever bearing 26 such that the link follower 6 arranged at the end of the lever arm 27 is swiveled in from radially outside into the link surface of the movable clutch half 2 or is swiveled out of it, respectively.

To this end, the lever 19 has two lever side arms 28, 29 arranged orthogonally to the lever arm 27. The inner lever side arm 28 may be pressed radially inwards by an actuating device 21, the functionality of which is not described in more detail herein, whereby the lever arm 27 moves radially outwards. Further, the outer lever side arm 29 is loaded by a tension spring 20 such that the lever arm 27 is biased radially inwards.

When the actuating device 21 is not active, the link follower 6 is thus always pressed radially inwards, whereby, as described above, the clutch device 1 is opened and held in the opened state. The clutch device 1 is thus opened while in the idle state.

If the clutch device 1 is to be closed, the actuating device 21 is actuated, whereby the inner lever side arm 28 is swiveled radially inwards and thus the lever arm 27 and the link follower 6 are swiveled radially outwards. Due to the loading of the movable clutch half 2 by the spring 30 towards the fixed clutch half 3, the movable clutch half 2 then moves axially towards the fixed clutch half 3, the spur teeth 22, 23 engage and the clutch device 1 is closed.

The spur teeth 22, 23 are preferably embodied as latching dog clutches. Thereby, the operating torque may be transmitted in an operationally reliable manner from the shaft 4 to the gearwheel 5. In this state, i.e., when the clutch device is closed, the link follower 6 is preferably not connected to any rotating structural parts.

FIG. 3 shows the clutch device 1 in a top view parallel to the plane A-B defined in FIG. 1. The movable clutch half 2 is located behind the fixed clutch half 3 which is attached to the gearwheel 5 in a non-visible manner. The movable clutch half 2 possesses internal splines 16 and may thereby, with simultaneous axial displaceability, transmit torques to the external splines 17 of the shaft 4 (see FIG. 4). The gearwheel 5 is pivoted on the shaft 4 and meshes with the gearwheel 5'. When the clutch device 1 is closed, the movable clutch half 2 enters into a positive connection with the fixed clutch half 3 arranged on the gearwheel 5.

When the clutch device 1 is opened, the two link followers 6 travel on the hold-open surface 15 and hold the clutch device 1 open. In the dashed depiction in FIG. 3, the link followers 6 are in the swiveled-out state, and the clutch device 1 can transmit a torque in this state. In this context, the link followers 6 are not located radially in a cylindrical region comprising the base region 10 of the link surface,
  the first, second and third circumferential portions 11, 12,
    13 of the link surface,
  the radial portion 14 of the link surface,
  and the hold-open surface 15.

In this context, the surfaces 11, 13 and 14 together with the link follower 6 each form a wedge gear set in the above-defined sense.

By means of the actuating device 21 and via the inner lever side arm 28 of the lever 19, the relative location of the link follower 6 with respect to the link surfaces and to the hold-open surface 15 and thus also to the respective other surface of the wedge gear set may be altered in order to effect a change in state of the clutch device 1. The change in location of the link follower 6 is effected by a spring 20, wherein the spring 20 is tensioned the most when the link follower 6 is located radially outwards of the movable clutch half 2, and is tensioned the least when the link follower 6 is in contact with the hold-open surface 15.

By means of an abutment surface 8 which is located on a support 7, the forces acting upon the link followers 6 during the opening process may in an advantageous design be diverted into the stand of the gear set.

The change in location of the link follower 6 may be effected by different mechanisms. The example embodiment in FIG. 3 shows the radial change in location of the link follower 6, which is fixedly connected to the lever arm 27 of the lever 19. One end of the tension spring 20 is fixedly connected to the stand, and the other end of the tension spring 20 is fastened to the outer lever side arm 29 and effects that, when the actuating device 21 is not actuated, the link follower 6 is always swiveled radially inwards towards the hold-open surface 15. In this way, the energy stored in the spring 20 is used to allow the link follower 6 to slide radially across the surfaces of the wedge gear set.

In contrast, the movement of the link follower 6 across the wedge gear set surfaces in the circumferential direction is evoked by the rotation of the shaft 4 and the movable clutch half 2. The orientation of the inclinations and curvatures of the wedge gear set surfaces in space are chosen in such a way that parts of the mechanical work transmitted via the clutch device 1 or via the gear set, respectively, are used as an aid to open the clutch device 1.

Figure 6:
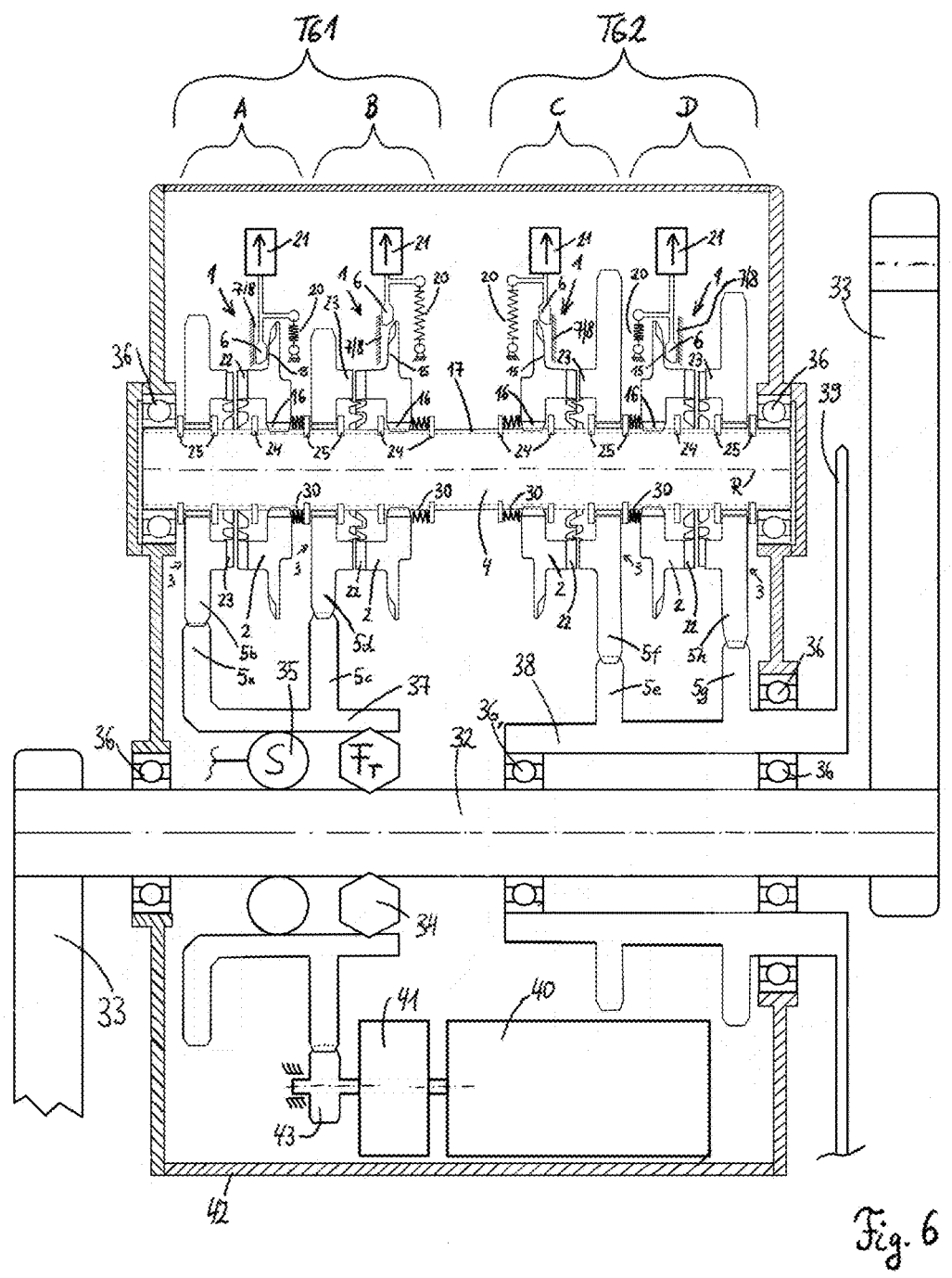
FIG. 6 shows a schematic sectional depiction of a bottom-bracket shifting system for a bicycle with an electric auxiliary drive and with four clutch devices according to the invention.

FIG. 6 shows a schematic sectional depiction of a bottom-bracket shifting system with an electric auxiliary drive 40 and with four clutch devices 1 according to the present invention.

The human pedal power is introduced into the bottom-bracket shaft 32 via the pedal arms 33. The output hollow shaft 38 is supported in the housing 42 via ball bearings 36. An input hollow shaft 37 is equipped with two gearwheel pairs 5a, 5b and 5c, 5d and is disposed coaxially to the bottom-bracket shaft 32. The torque of the cyclist is introduced from the bottom-bracket shaft 32 via a freewheel 34 into the hollow input shaft 37. A sensor 35 is arranged between the bottom-bracket shaft 32 and the hollow input shaft 37 and acquires the values relevant for motor control, such as speed, torque and angle of rotation. The schematically depicted electric auxiliary drive 40 drives the coupling gearwheel 43 via a gear set 41. From the input hollow shaft 37, the torque is relayed via the gearwheels 5a and 5c as well as the associated gearwheels 5b, 5d and from there selectively via a clutch device 1 according to the invention to the shaft 4.

In the example design according to FIG. 6, two gearing stages A and B together form a first partial gear set TG1 with two gear stages. Within the first partial gear set TG1, there are two clutch devices 1 according to the invention.

Where a partial gear set is mentioned presently, this means a subassembly within a change-speed gear set which provides at least two different gear ratios. A partial gear set may be embodied as a shiftable spur gear set, a shiftable planetary gear set or as a different gear set.

A second partial gear set TG2 with the gearing stages C and D is also located on the shaft 4 in the depiction on the right and transmits the torque from the shaft 4 via further gearwheel pairs 5e, 5f and 5g, 5h to the output hollow shaft 38.

The output hollow shaft 38 is supported on the housing 42 and on the bottom-bracket shaft 32 via ball bearings 36 and is disposed coaxially to the bottom-bracket shaft 32. The output hollow shaft 38 transfers the torque to the output pinion 39, which drives the driven wheel of the vehicle via a traction means (not depicted), for example a chain or a belt.

The gearing stages A, B, C, D are embodied as spur gear sets herein. In this example embodiment, the first partial gear set TG1 possesses two gears and the second partial gear set TG2 also possesses two gears. Since the two partial gear sets TG1, TG2 are connected in series, the total number of gears is 2×2=4 gear stages.

Further example embodiments, not depicted herein, of change-speed gear sets with the clutch device according to the invention involve more than two gear stages in each partial gear set. If, for example, the first partial gear set involves four gear stages and the second partial gear set involves three gear stages, the total number of possible gears would be twelve.

In FIG. 6, the gearwheels 5b, 5d, 5f and 5h are mounted as idler gears on the shaft 4 and are axially fixed by means of retaining rings 25, in this case Seeger rings. Together with the respective spur teeth 23, they form the fixed clutch halves 3. The movable clutch halves 2 are connected to the shaft 4 via internal and external splines 16, 17 and can thus transmit a torque. Nevertheless, the clutch halves 2 are arranged to be axially displaceable on the shaft 4 and in turn possess retaining rings 24, in this case also Seeger rings, and in some cases also the retaining rings 25 as axial stops. The compression springs 30 are arranged in such a way that the movable clutch halves 2 are persistently pressed towards the fixed clutch halves 3. If the movable clutch halves 2 are not connected to the respective link follower 6, they are thus closed and are activated. The clutch devices 1 of the gearing stages B and C are depicted in FIG. 6 in a closed state. The respective link follower 6 is pulled very far radially outwards by the respective actuating device 21 and is not connected to the respective link surfaces. The respective tension spring 20 is tensioned.

In contrast, the gearing stages A and D are in a deactivated, opened state. The respective link follower 6 is connected to the respective hold-open surface 15. The respective spring 30 cannot close the respective clutch device 1 since the respective movable clutch half 2 is supported on the housing 42 via the respective link follower 6 and via the respective abutment surface 8.

It may be appreciated from FIG. 6 that an advantageous design within a gear-shifting system results from at least two clutch devices 1 being located in each partial gear set TG1, TG2.

A large number of gear stages may be achieved if at least two partial gear sets TG1, TG2 are connected in series, wherein each partial gear set TG1, TG2 contains at least two clutch devices 1 according to the invention.

A particularly light-weight and space-saving construction results if at least two partial gear sets TG1, TG2 with the clutch devices 1 according to the invention are arranged coaxially with respect to one another.

Thus, preferably two, and more preferably four or more than four, clutch devices 1 are arranged coaxially with respect to one another.

The shifting process from one gear stage to another gear stage can be carried out very reliably and without idling, in particular, if the engagement process of a first clutch device 1 is carried out in time before the disengagement process of a second clutch device 1 within the same partial gear set TG1, TG2.

The shifting process from one gear stage to another gear stage can thus be carried out very reliably and without idling, in particular, if during the shifting process there is an instant or period at which or during which, respectively, the movable clutch halves 2 are each in engagement with the fixed clutch halves 3 of two clutch devices 1.

Deactivating a clutch device 1 is possible in a particularly simple manner, without any disturbances and without any high expense in terms of energy or control within the actuating device 21, if the link follower 6 is moved relative to the link surfaces 10-14 and/or to the hold-open surface 15 with the aid of a spring 20. Where deactivating is mentioned in this document, this means the process which leads to the clutch device 1 being transitioned to a state in which it cannot transmit any torque, that is, the opening of the clutch.

LIST OF REFERENCE SYMBOLS

1 Clutch device
2 Movable clutch half
3 Fixed clutch half
4 Shaft
5, 5' Gearwheel
5a-h Gearwheel
6 Link follower
7 Support
8 Abutment surface for link follower
9 Stop surface for link follower
10 Base region of link surface
11 First circumferential portion of the link surface
12 Second circumferential portion of the link surface
13 Third circumferential portion of the link surface
14 Radial portion of the link surface
15 Hold-open surface
16 Internal splines
17 External splines
18 Through-hole
19 Lever
20 Tension spring
21 Actuating device
22 Spur teeth on the movable clutch half
23 Spur teeth on the fixed clutch half
24, 25 Retaining ring
26 Lever bearing
27 Lever arm
28 Inner lever side arm
29 Outer lever side arm
30 Spring, compression spring
31 Rotating abutment surface for link follower
32 Bottom-bracket shaft
33 Pedal arm
34 Bottom-bracket freewheel
35 Sensor
36 Ball bearing
37 Input hollow shaft
38 Output hollow shaft
39 Output pinion
40 Electric auxiliary drive
41 Gear set
42 Housing
43 Coupling gearwheel
R Axis of rotation
B1-B3 Motion path
A First gear ratio B Second gear ratio
C Third gear ratio
D Fourth gear ratio
TG1 First partial gear set
TG2 Second partial gear set

The invention claimed is:

1. A clutch device for selective transmission of a torque from a first shaft or hub to a second shaft or hub, in particular for a gear-shifting system for a bicycle, comprising:
   a first clutch half connected to the first shaft or hub in a rotationally fixed manner,
   a second clutch half connected to the second shaft or hub in a rotationally fixed manner,
   a first opening device configured to generate, from an operating torque with which the first clutch half is supplied, a first opening force via which the clutch device is transitionable from a closed state, in which a torque is transmittable from the first clutch half to the second clutch half, to an opened state, in which no torque is transmittable from the first clutch half to the second clutch half, and
   an actuating device configured to control the first opening device,
   wherein the first opening device is arranged spatially separated from a torque transmission region of the clutch device, i.e., from a spatial region at which, in the closed state of the clutch device, a torque transmission from the first clutch half to the second clutch half may take place, and
   wherein a second opening device configured to generate, without use of the operating torque, a second opening force via which the clutch device is transitionable from the closed state to the opened state, wherein the actuating device is configured to control the second opening device, and wherein an operating torque at which the second opening device is effective is preferably less than an operating torque at which the first opening device is effective.

2. The clutch device according to claim 1, wherein the first opening device is arranged radially further outwards than the torque transmission region.

3. The clutch device according to claim 1, wherein a movable clutch half which is one of the first clutch half and the second clutch half is movable in an axial direction of the first shaft or hub or the second shaft or hub, respectively, and wherein the first opening device has:
   at least one first link surface arranged on the movable clutch half, extending in a first direction of extension substantially in a circumferential direction of the movable clutch half and having such a first curvature that a position changes in an axial direction of a point on the first link surface along the first direction of extension, and
   at least one first link follower configured to contact the first link surface along the first direction of extension upon rotation of the movable clutch half, thereby to generate the first opening force and thereby to effect a movement of the movable clutch half in the axial direction, whereby the clutch device is transitioned from the closed state to the opened state,
   wherein the actuating device is configured to engage the at least one first link follower with the first link surface and to disengage it from the first link surface.

4. The clutch device according to claim 3, wherein the second opening device comprises:
   at least one second link surface arranged on the movable clutch half, extending in a second direction of extension substantially in a radial direction of the movable clutch half and having such a second curvature that a position changes in an axial direction of a point on the at least one second link surface along the second direction of extension, and at least one second link follower configured to contact the at least one second link surface along the second direction of extension, thereby to generate the second opening force and thereby to effect a movement of the movable clutch half in the axial direction, whereby the clutch device is transitioned from the closed state to the opened state, wherein the actuating device is configured to engage the at least one second link follower with the at least one second link surface, to move it along the second direction of extension and to disengage it from the second link surface, and wherein the at least one first link surface is at least partially identical to the at least one second link surface, and/or the at least one first link follower is substantially identical to the at least one second link follower.

5. The clutch device according to claim 3, wherein at least one first link surface and the at least one first link follower together form a wedge gear set.

6. The clutch device according to claim 3, wherein the first opening device furthermore has a first hold-open surface arranged on the movable clutch half such that the clutch device is in the opened state upon contacting the first hold-open surface by the at least one first link follower, wherein the first hold-open surface is arranged adjacent to a region of the first link surface upon contacting of which by the at least one first link follower the clutch device is in the opened state.

7. The clutch device according to claim 6, wherein the first hold-open surface is substantially identical to a second hold-open surface.

8. The clutch device according to claim 3, wherein the at least one first link follower, via a movement of the at least one first link follower in the radial direction of the movable clutch half, in particular by a lever or slider mechanism, is engageable with the at least one first link surface and/or disengageable from the at least one first link surface.

9. The clutch device according to claim 8, wherein the movement of the at least one first link follower in the radial direction of the movable clutch half upon engaging the at least one first link surface is at least partially effected by a spring, in particular by releasing the spring.

10. The clutch device according to claim 3, wherein the first opening device has a plurality of first link surfaces arranged along the circumferential direction of the movable clutch half.

11. The clutch device according to claim 1, wherein the second opening device is arranged radially further outwards than the torque transmission region.

12. The clutch device according to claim 1, wherein the second opening device comprises:

at least one second link surface arranged on the movable clutch half, extending in a second direction of extension substantially in a radial direction of the movable clutch half and having such a second curvature that a position changes in an axial direction of a point on the at least one second link surface along the second direction of extension, and at least one second link follower configured to contact the at least one second link surface along the second direction of extension, thereby to generate the second opening force and thereby to effect a movement of the movable clutch half in the axial direction, whereby the clutch device is transitioned from the closed state to the opened state, wherein the actuating device is configured to engage the at least one second link follower with the at least one second link surface, to move it along the second direction of extension and to disengage it from the second link surface.

13. The clutch device according to claim 12, wherein at least one second link surface and the at least one second link follower together form a wedge gear set.

14. The clutch device according to claim 12, wherein the at least one second link surface has a second hold-open surface, wherein the clutch device is in the opened state upon contacting the second hold-open surface by the at least one second link follower.

15. The clutch device according to claim 12, wherein the at least one second link follower, via a movement of the at least one second link follower in the radial direction of the movable clutch half, in particular by a lever or slider mechanism, is engageable with the second link surface and/or disengageable from the second link surface.

16. The clutch device according to claim 15, wherein the movement of the at least one second link follower in the radial direction of the movable clutch half upon engaging the second link surface and/or the movement of the at least one second link follower along the second direction of extension is at least partially effected by a spring, in particular by releasing the spring.

17. The clutch device according to claim 12, wherein the second opening device comprises a plurality of second link surfaces arranged along the circumferential direction of the movable clutch half.

18. The clutch device according to claim 12, wherein the second opening device comprises a plurality of second link followers arranged along the circumferential direction of the movable clutch half.

19. A gear-shifting system for a bicycle with at least one clutch device according to claim 1.

20. A clutch device for selective transmission of a torque from a first shaft or hub to a second shaft or hub, in particular for a gear-shifting system for a bicycle, comprising:

a first clutch half connected to the first shaft or hub in a rotationally fixed manner, a second clutch half connected to the second shaft or hub in a rotationally fixed manner, a first opening device configured to generate, from an operating torque with which the first clutch half is supplied, a first opening force via which the clutch device is transitionable from a closed state, in which a torque is transmittable from the first clutch half to the second clutch half, to an opened state, in which no torque is transmittable from the first clutch half to the second clutch half, and an actuating device configured to control the first opening device, wherein the first opening device is arranged spatially separated from a torque transmission region of the clutch device, i.e., from a spatial region at which, in the closed state of the clutch device, a torque transmission from the first clutch half to the second clutch half may take place, wherein a movable clutch half which is one of the first clutch half and the second clutch half is movable in an axial direction of the first shaft or hub or the second shaft or hub, respectively, and wherein the first opening device has:

at least one first link surface arranged on the movable clutch half, extending in a first direction of extension substantially in a circumferential direction of the movable clutch half and having such a first curvature that a position changes in an axial direction of a point on the first link surface along the first direction of extension, and at least one first link follower configured to contact the first link surface along the first direction of extension upon rotation of the movable clutch half, thereby to generate the first opening force and thereby to effect a movement of the movable clutch half in the axial direction, whereby the clutch device is transitioned from the closed state to the opened state, wherein the actuating device is configured to engage the at least one first link follower with the first link surface and to disengage it from the first link surface, and wherein the first opening device has a plurality of first link followers arranged along the circumferential direction of the movable clutch half.

\* \* \* \* \*